Jan. 28, 1936.  J. G. GIBSON  2,029,162
BAR CLAMP FOR BELTS
Filed Jan. 30, 1934  3 Sheets-Sheet 2
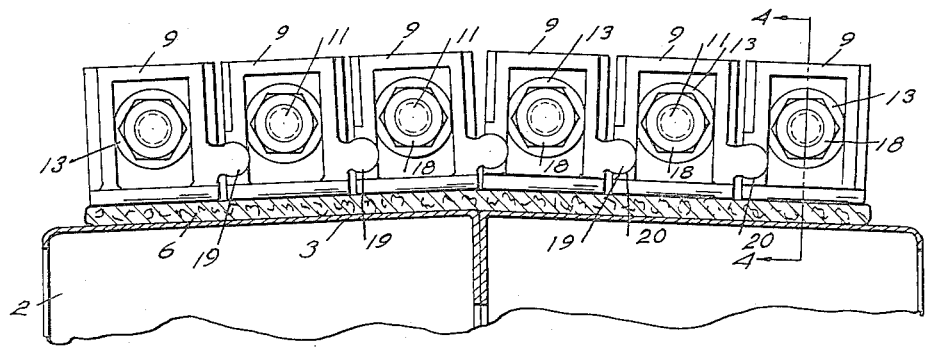
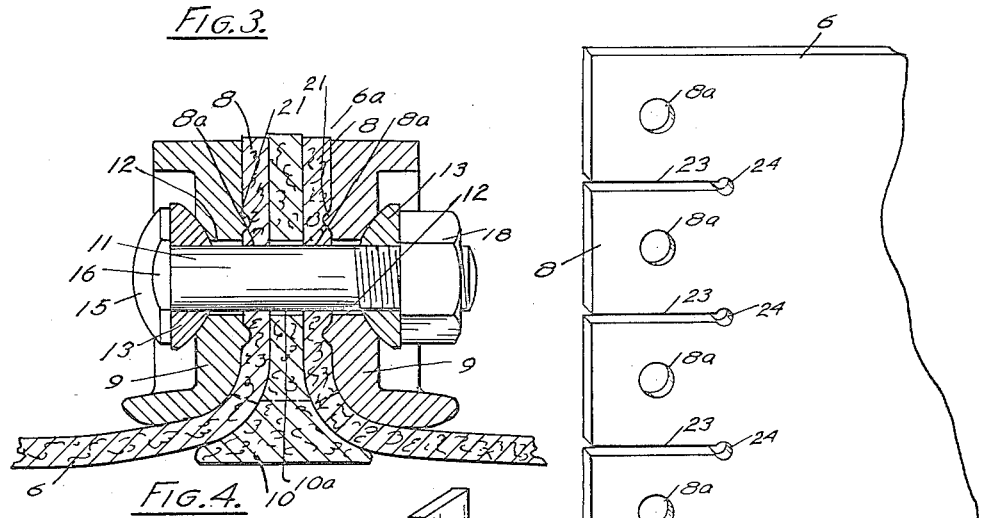
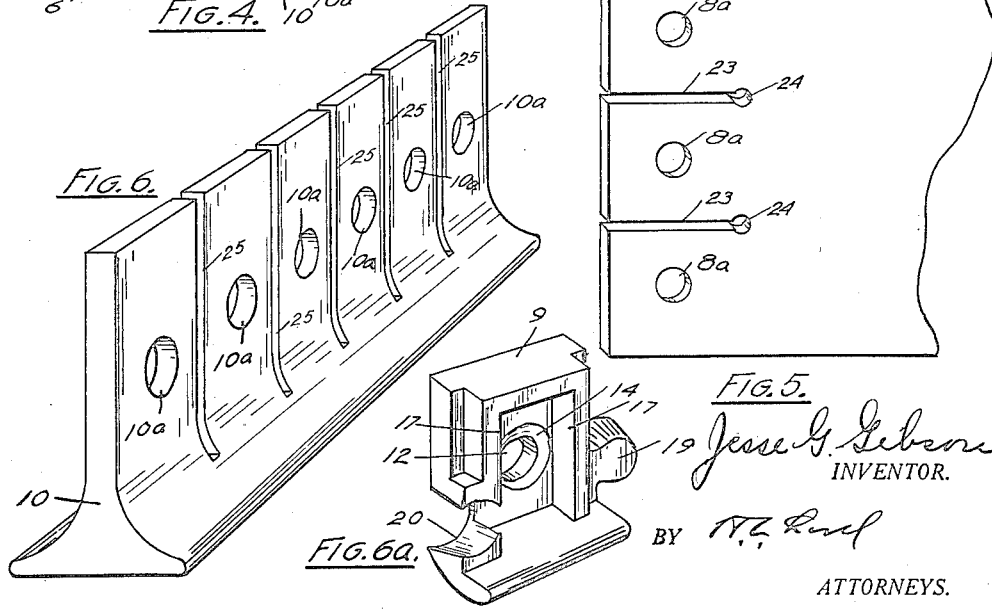
Jesse G. Gibson
INVENTOR.
BY
ATTORNEYS.

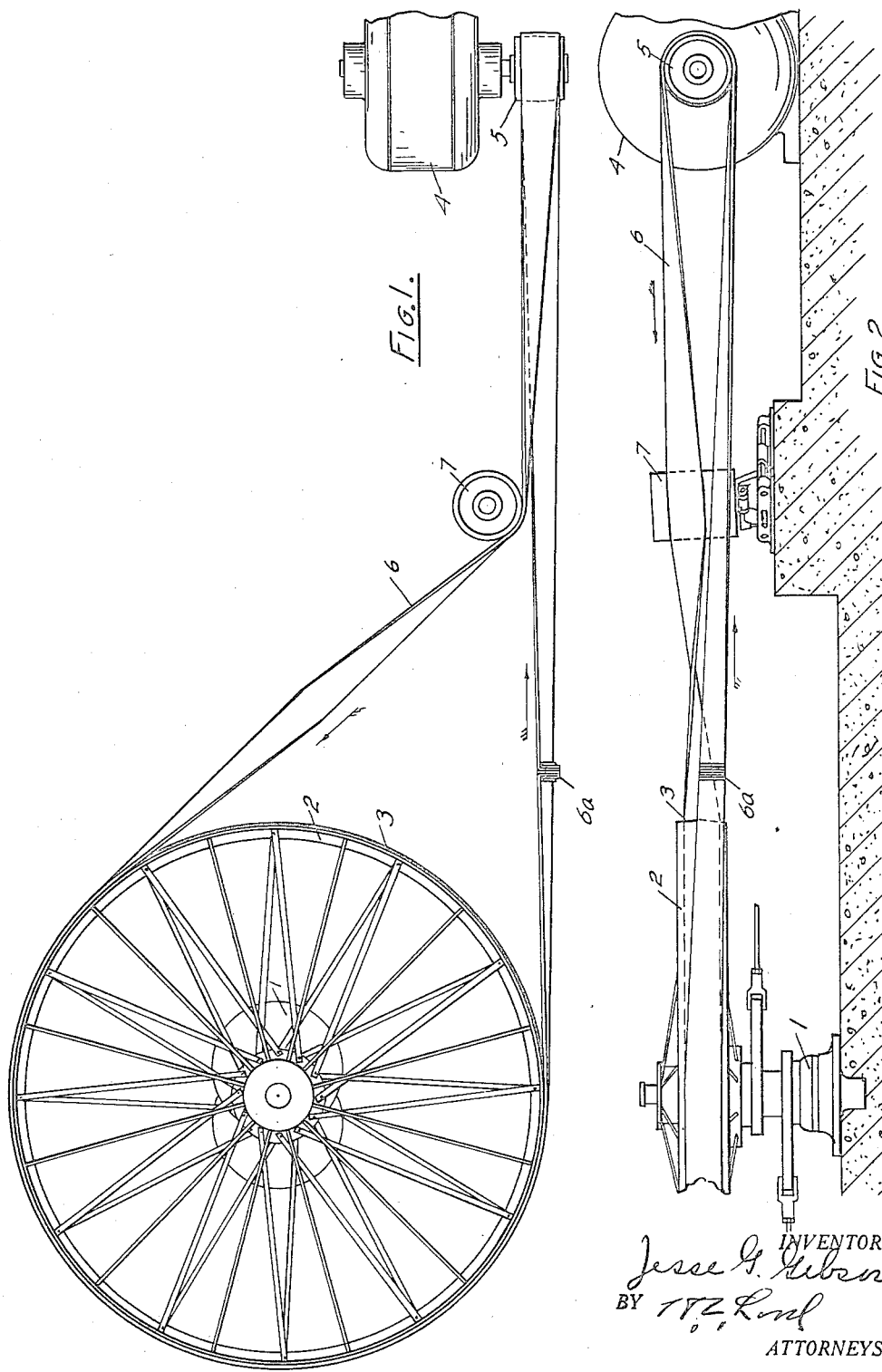

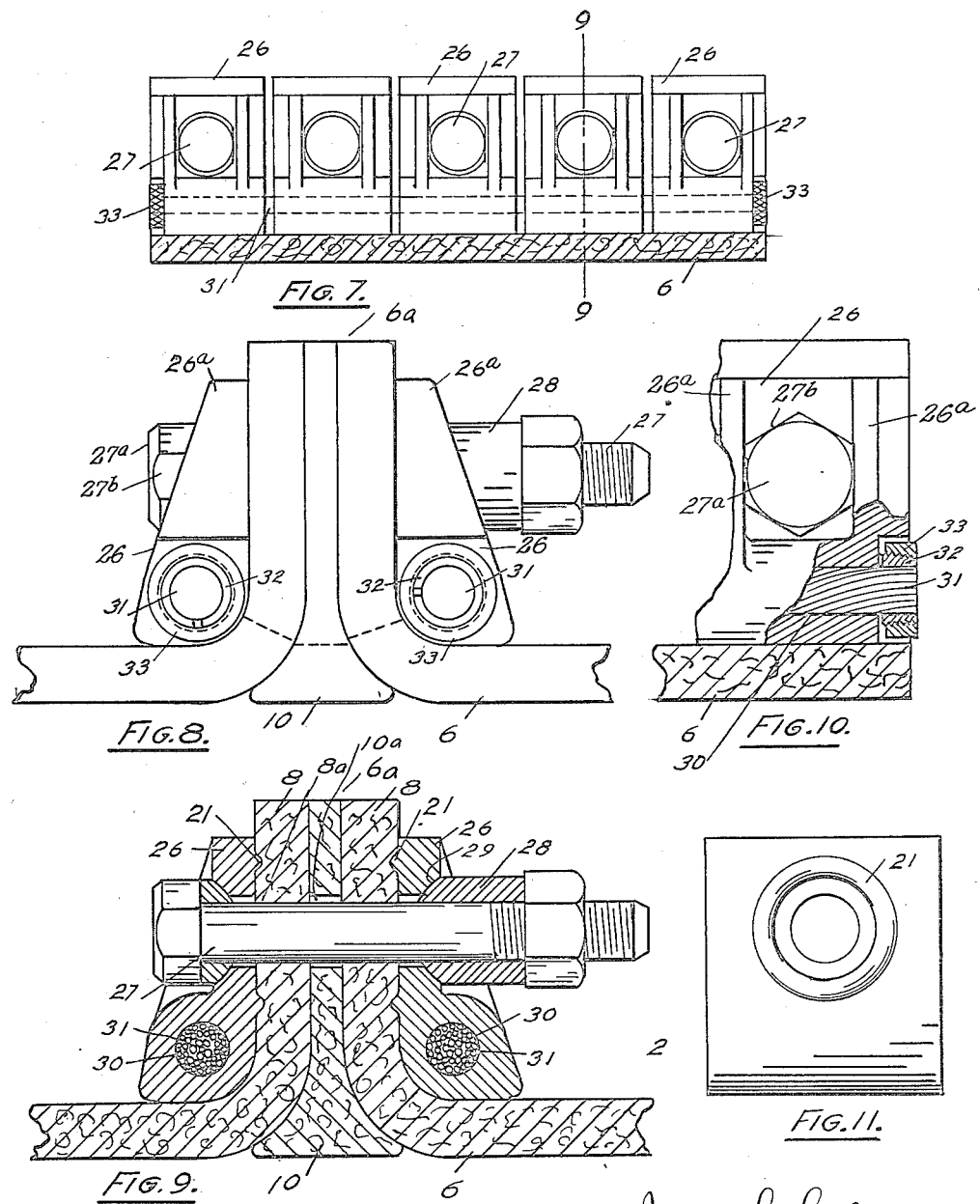

Patented Jan. 28, 1936

2,029,162

UNITED STATES PATENT OFFICE 2,029,162

BAR CLAMP FOR BELTS

Jesse G. Gibson, Bradford, Pa., assignor of fifty-one per cent to Bovaird and Company, Bradford, Pa., a copartnership consisting of George W. Bovaird and Joseph H. Bovaird Application January 30, 1934, Serial No. 708,980

15 Claims. (Cl. 24—31)

Bar clamps for belts as heretofore commonly made have involved two opposing plates between which the outwardly turned ends of the belts have been clamped. The bars as commonly used have been rigid, particularly edgewise so that the belt as it has run over the crown surfaces of the pulleys has received undue wear at the center of the belt under the clamp. Many of these belts are used under circumstances that require the twisting of the belts and where this is done the rigidity of the bars prevents the belt from adjusting itself to the strains incident to the twisting. By reason of the fact that the belt cannot adjust itself and thus distribute the strain, the rigid bar clamps tend to separate the plies of the belts both as an incident to the twisting of the belt and the action of the crown surface of the pulley on the belt and the separation of the plies once started usually results in the rapid destruction of the belt. The present invention is designed to obviate this difficulty by providing bar clamps that are edgewise flexible. Preferably this flexibility is accomplished by forming the bar in sections, preferably connected and articulated. The invention also contemplates supplementing the flexibility of the bar by making the outwardly extending portions of the belt more flexible and this is accomplished by slotting the belts endwise so that the portion under the clamps can more readily flex with the clamps. Where a filler is used it is preferable also to similarly slot the filler so that it may readily flex. In this way a bar clamp which definitely secures the ends of the belt is provided which permits the belt to follow the contours of the pulleys over which it runs and to relieve itself, or adjust itself as the belt is twisted and run over the pulleys. Features and details of the invention will appear from the specification and claims.

A preferred embodiment of the invention is illustrated in the accompanying drawings as follows:—

Fig. 1 shows a plan view of the application of a belt to a pumping power.

Fig. 2 a side elevation of the same installation.

Fig. 3 an elevation of the bar clamp with a pulley and belt in section.

Fig. 4 a section on the line 4—4 in Fig. 3.

Fig. 5 an elevation of a belt end.

Fig. 6 a perspective view of a filler strip.

Fig. 6a a view of a detached section of the bar.

Fig. 7 shows an elevation of a modified section of clamp.

Fig. 8 an end elevation.

Fig. 9 a section on the line 9—9 in Fig. 7.

Fig. 10 an enlarged view, partly in section, of one of the sections viewed from the right of Figure 8.

Fig. 11 an elevation of a detached section.

1 marks a pump power, 2 a band wheel driving the power, 3 a crowned rim of the band wheel, 4 a driving motor, 5 a crowned pulley driven from the motor, 6 a belt, and 7 a belt tightener. Belts of this character are ordinarily seventy to eighty feet long and subjected to very severe service. The belt is spliced at 6a, the ends of the belt being brought together and bent outwardly and clamped between opposing clamps. The driving motor usually is a horizontal pulley. The band wheel is ordinarily vertically arranged and the belt tightener 7 is also vertically arranged. This involves the twisting of the belt from the horizontal to the vertical relation of the pulleys and in addition to this it involves a complete half twist of the belt between the tightening belt and the band in order to reverse the outward extension of the belt at the clamp. While there are other uses of belts that involve this type of belt clamp the use here illustrated as indicating the strains to which belts of this type are subjected is by far the more common.

The belt ends 8 are out-turned, as shown in Fig. 4. These are secured between the bar clamps which, according to the present invention are formed in sections 9. Filler strips 10, usually of T-shape are preferably provided between the ends of the belt so as to fill the space at the turn of the belt and to add to the security of the clamp. Bolts 11 extend through openings 12 in the clamp and openings 8a in the belt ends and 10a in the filler. This filler is preferably formed with rubber or rubber and fabric. These set the clamp so as to secure the ends of the belt. Washers 13 having one face preferably spherical are arranged to operate in sockets 14 around the openings 12. These washers are preferably formed with metal. A bolt head 15 has flats 16 which engage ribs 17 of the bar sections and thus prevent the bolts turning as the nuts 18 are set up.

In the modification shown in Fig. 3, each section has a hinge projection 19 and a socket 20 arranged in its opposite edges. The projection of one section extends into the socket of the next adjacent section, thus uniting these sections, but permitting of complete flexure. Preferably the projections and sockets are tapered so that should a bolt of one section be broken the locking surfaces incident to the taper would prevent the section from escaping from the bar assembly.

In order to make the turned ends of the belts more flexible the ends of the belts are slotted at 23 and these slots preferably correspond with the lines of separation between the sections. Each slot terminates in a round opening 24 which prevents the running of the slot further into the belt as it is used.

The filler strip is preferably also slotted at 25, the slots terminating at the thickened edge of the strip. Here also the slots 25 preferably register with the separation between the sections so that each section as it is set up engages a portion of the belt between the slots and includes a portion of the filler strip between the slots. In this way a full clamping action is given to the joint between the belt ends and full flexibility so that the belt may readily conform to the crowned surfaces of the pulleys and also ease itself in the twists which are made in the belt. The rocking surfaces between the washers 13 and the walls of the socket 14 also add to this flexibility. While I have shown and preferably lock the sections together it will be understood that they will operate satisfactorily without such connection. Such connection, however, adds an element of safety in that should a bolt of any section break the connection of that section with other sections it prevents the discharge of the section released which, if the belt is of high velocity, introduces an element of danger.

Preferably the bars are provided with ribs 21 which extend around the openings 12. These ribs indent the belt and thus make the clamping action on the belt as a whole more secure and at the same time re-enforce the belt at the openings.

In the modification shown in Fig. 7 and following the belt is similar to that shown in Fig. 3. The clamp is formed of bar sections 26 and these are secured by bolts 27 around which are arranged sockets 29 in which are arranged the washers, or blocks 28. The bolt heads 27a have flats 27b, which engage ribs 26a on the sections so as to prevent the turning of the bolts in the sections. These parts operate in a manner similar to those of Fig. 3. Each section is provided with a transverse opening 30 and a flexible cable 31 is carried through these openings. The ends of the cable are secured by clamping the nut having a contractible portion 32 and a contracting member 33. Thus the bar sections are definitely secured together, but are free to flex to accommodate the different conditions to which the belt is exposed.

My invention is directed to bar clamps. By bar clamps I mean a clamp which clamps the outwardly projecting out-turned ends of belts together.

What I claim as new is:—

1. A bar clamp for belts comprising opposing series of bar sections, said sections having complementary hinge members at opposite sides connecting the sections, said hinge members having surfaces locking one section against disengagement from another.

2. In a device of the character described outwardly projecting belt ends; edgewise flexible clamping bars on the opposite faces of the belt ends; and bolts connecting the bars, the outwardly projecting ends of the belts being slotted.

3. In a device of the character described outwardly projecting belt ends; edgewise flexible clamping bars on opposite faces of the belt ends; a filler strip between the belt ends, said filler strip being slotted from its outer edge inwardly; and bolts connecting the bars.

4. In a device of the character described, outwardly projecting belt ends; clamping bar sections on opposite faces of the belt ends; and bolts connecting the sections, the belt ends being slotted, the slots registering with the points of separation between the sections.

5. In a device of the character described, outwardly projecting belt ends; clamping bar sections on opposite faces of the belt ends; bolts connecting the sections; and a filler strip between the belt ends, said filler strip being slotted from the outer edge inwardly, the slots corresponding with the lines of separation between the sections.

6. In a device of the character described, outwardly projecting belt ends; clamping bar sections on the opposite faces of the belt ends; bolts connecting said sections, said belt ends being slotted, the slots registering with the separations between the sections; and a filler strip between the belt ends, said filler strip being slotted to register with the lines of separation.

7. A filler strip for belt clamps slotted from one edge.

8. A bar clamp for belts having bolt openings and bolt engaging ribs around the openings.

9. A bar clamp formed in sections, each section having a transverse opening; flexible members extending through the openings connecting the sections; and bolts uniting the opposing sections.

10. The combination of clamping bars for belts having bolt openings therethrough and curved sockets around the openings; washers having curved ends operating in the sockets; and bolts extending through the bars and washers.

11. The combination of clamping bars for belts, said bars being formed in sections and having bolt openings therethrough; curved sockets around said openings; washers having curved ends operating in the sockets; and bolts extending through the bars and washers.

12. The combination of clamping bars for belts, said bars being formed in sections, the sections being ribbed along their edges; and clamping bolts uniting opposing sections, said bolts having heads with flats engaging the ribs of the sections to lock the bolts against turning.

13. A bar clamp for belts comprising opposing series of articulated bar sections, each series having a plurality of sections at each end of the series; and bolts connecting the opposing sections.

14. A bar clamp for belts comprising opposing series of bar sections, said sections having complementary hinged members at opposite sides of the sections connecting the sections, the hinged members being integral with their sections and having integral portions forming hinged pivots.

15. In a device of the character described outwardly projecting belt ends; edgewise flexible clamping bars on the opposite faces of the belt ends, said bars comprising a series of opposing bar sections, each series comprising a plurality of sections at each end of the series; and a single bolt connecting each pair of opposing sections.

JESSE G. GIBSON.